Nov. 9, 1965  U. C. I. SELLMAN  3,217,290
PROJECTILE MISS DISTANCE DEVICE FOR USE ON A TARGET OR THE LIKE
Filed Oct. 15, 1962
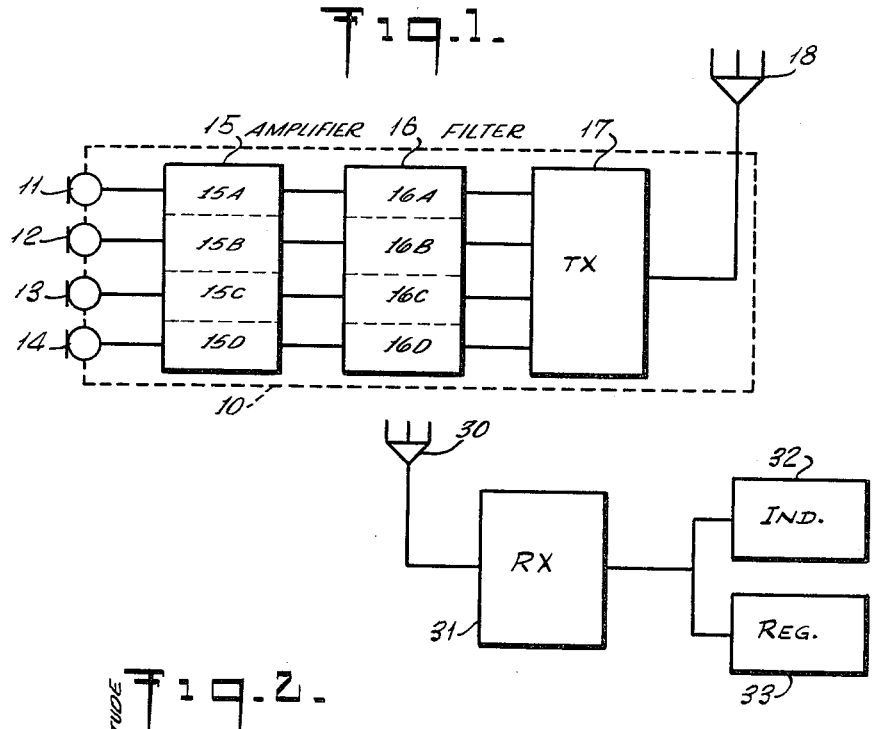
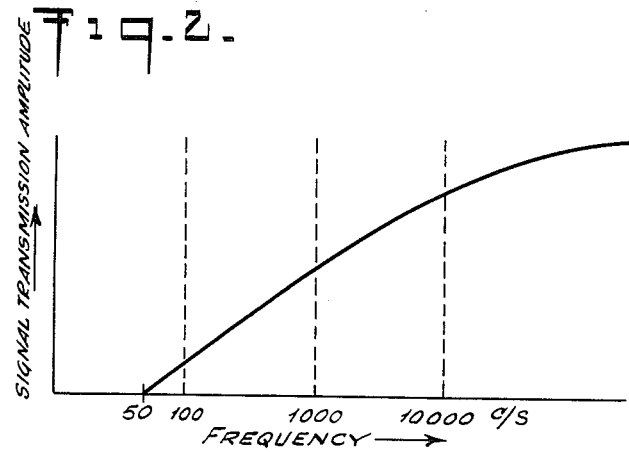
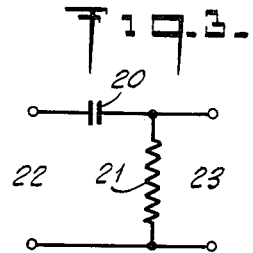
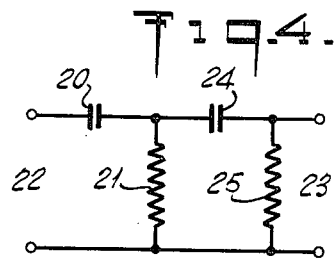
INVENTOR.
ULF CARL IWAR SELLMAN
BY
ATTORNEY

United States Patent Office 3,217,290
Patented Nov. 9, 1965

3,217,290
PROJECTILE MISS DISTANCE DEVICE FOR USE ON A TARGET OR THE LIKE
Ulf C. I. Sellman, Roslags-Nasby, Sweden, assignor to Instrumentfabriksaktiebolaget Lyth, Stockholm, Sweden
Filed Oct. 15, 1962, Ser. No. 230,431
Claims priority, application Sweden, Oct. 16, 1961, 10,219/61
6 Claims. (Cl. 340—16)

This invention relates to devices for indicating or measuring the distance of closest approach of an object to another. The invention is principally directed to a device for indicating or measuring the distance by which a projectile fails to hit an airborne target, such as a target aircraft drone or the like. It is convenient to refer to such a device as a miss distance indicator, though it can be used for other analogous purposes.

In practice firing against airborne targets it is a matter of great importance to be able to determine the miss distance, that is, the minimum distance between the target and the flight of the projectile. It is also of practical importance that the determination of miss distance can be made very rapidly and transmitted without delay to the firing point, and there made available to the team firing the weapon, or to others concerned with the accuracy of shooting.

A miss distance indicator in accordance with the present invention makes use of the fact that the passage of a high speed projectile, and especially a projectile moving with a speed greater than the speed of sound, gives rise to a pressure wave which travels outwardly from the path of the projectile. The characteristics of this pressure system which is generated by the projectile, as regards its shape, energy, rate of propagation and rate of decay, depends upon a number of parameters. Little information has been published concerning the nature of this pressure system.

However, the present invention is made possible by the fact that the pressure wave is attenuated in energy as it is propagated outwardly from the path of the projectile, and by a method of calibration it becomes possible to utilize this pressure wave system as an indication of the distance between a suitable transducing device, and the point of nearest approach of the path of the projectile. Further, by an appropriate design of the transducer or of its associated and responsive equipment, it is possible to use the transducer response as a reliable means of indicating this miss distance.

In accordance with one feature of the present invention, there is provided a miss distance indicator comprising a pressure wave responsive transducer, and signal amplifying or transmitting means associated with the transducer, the apparatus being such that the effect of higher frequency components of the pressure wave is emphasized in relation to the effect of components of lower frequency.

The pressure wave produced by a high speed projectile consists of a thin layer of air, part of which is highly compressed, so as to be at a pressure substantially above atmospheric pressure. Owing to the impulsive nature of its generation, the pressure pattern can be regarded as having components of widely differing frequencies, extending over a substantial spectrum of frequencies. In the case in question, the pressure wave will include components in the low audio frequency range and also components extending to frequencies considerably above the normal audio frequencies.

It has been discovered that as the pressure wave travels outwardly from the flight path of the projectile, the nature of the pressure wave pattern changes. Specifically, it is found that the different components of the pressure wave are attenuated at relatively different rates and in particular the higher frequency components become more rapidly attenuated than do those of lower frequency. Accordingly, at a distance from the path of the projectile the pressure wave will have a lesser proportion of higher frequencies, and with the apparatus according to the invention the response of the transducer system is made more accurate by relying more upon the higher frequency components of the pressure wave. It may be noted that the lower frequency components of the wave are of generally greater energy than those of higher frequency, and so the lower frequency components will tend to travel further than those of higher frequency in any case. By reducing the effect of the low frequency components of the wave the sensitivity of the system as a whole may be reduced somewhat, but its accuracy is improved. It is possible to achieve an adequate compromise between the conflicting requirements of sensitivity and accuracy.

Other features and advantages of the invention will appear from the following description of one embodiment thereof, given by way of example, in conjunction with the accompanying drawings, in which:

FIGURE 1 is a much simplified block diagram of transmitting and receiving apparatus operating in accordance with the invention, FIGURE 2 is a graph showing the frequency characteristic of a filter circuit suitable for use with the invention, FIGURE 3 is an example of a filter circuit, and FIGURE 4 is an example of a further filter circuit.

The form of the invention which is about to be described is intended to respond to the passage of the projectile. The apparatus can be used either to indicate the "hit," which can be defined as the projectile passing within a predetermined distance of the target, which may be a target aircraft or drone or the like, or the apparatus can be used to give an indication of the distance by which the projectile misses the target, that is to say, the minimum distance between the target and the projectile. In either of these two cases it is desirable that there should be obtained an indication which is as accurate as possible. In the first case the distinction between what is defined as a "hit" and that which is a "miss" should be clearly established and in the latter case, where an indication of the miss distance is obtained, the indication should be subject to as small a tolerance as possible.

The device in accordance with the invention responds to the pressure wave that is set up when the projectile passes at high speed through the air. Though it is convenient to refer to it as an acoustic wave, it is not a sound in the ordinary sense but is a pressure wave system that passes outwardly from the path of the projectile, and is that pressure wave which can normally be examined in a Schlieren diagram. At any point, the pressure wave consists of a thin or very thin layer of air which is considerably compressed, with attendant zones of rarefaction.

The precise nature of the pressure wave will depend upon a number of factors, but in all cases the pressure wave will become more and more attenuated as it travels outwardly from the path of the projectile. However, for a given size of projectile the response can be calibrated and the energy of the pressure wave at a distance from the projectile can be used to give an indication of that distance.

With the invention, the accuracy of indication obtained in the system of this kind is improved, by taking advantage of the fact not only that the energy, or maximum amplitude, of the pressure wave is attenuated with distance but also that the particular characteristic of the pressure wave changes in its travel.

The impulsive nature of the generation of the pressure wave produces a steep pressure gradient at the front of the wave. This in effect means that if the pressure wave is represented as consisting of a series of components extending over a frequency spectrum, there will be a substantial proportion of components of higher frequencies. As the pressure wave travels outwardly, the pressure gradient decreases more rapidly than the peak value of the pressure in the wave. If, therefore, the pressure wave is examined at a point distant from the path of the projectile, it will be found to have a different distribution of energy at different frequencies, and specifically the higher frequency components will be relatively more attenuated than those of lower frequencies.

In the apparatus of the present invention this fact is utilized by arranging that the higher frequencies of the pressure wave are used wholly or partly as the parameter by which the indication of miss distance is obtained.

Turning now to the drawings, there is mounted on or near the target, which is indicated by the broken line 10, a series of pressure responsive transducers indicated at 11, 12, 13, 14. The transducers are coupled to an amplifying unit 15, in turn feeding a filter 16 and a transmitter 17, by which a radio signal is transmitted from aerial 18 to the ground or relayed from the towing aircraft. Considering for the moment the operation only of, say, transducer 11, this is arranged at a position upon the target at which it will be exposed to the pressure wave caused by the passage of the projectile. The output of the transducer is amplified, and the filter 16 is used to diminish the effect of the lower frequency components of the output of transducer 11. There is accordingly obtained from the output of filter 16 a signal which is indicative of the amplitude or the relative amplitude of the higher frequency components of the transducer output and this is transmitted to the ground to give the desired miss distance indication.

The transducers 12, 13 and 14, or any combination of these or other transducers, can be used to modify the directional response of the system to the projectile. Pressure transducers must necessarily have a polar diagram of response which is not spherical but by employing a plurality of microphones with appropriately combined responses a spherical response can be more nearly obtained. Where the transducers are used with this object, it may be convenient to combine their outputs in the amplifier 15, and use a single output amplifier 15, passing the common output through filter 16 to transmitter 17. However, it can also be arranged that the outputs of the separate transducers are fed through separate channels 15A, 15B, 15C and 15D in the amplifier 15 and through separate channels 16A, 16B, 16C and 16D in the filter 16, and transmitted to the ground while retaining their individual identities. In such a case it can be arranged not only that a signal is obtained which is indicative of the proximity of the projectile but by comparing the relative responses of the different transducers the direction of the path of the projectile in relation to the target can also be obtained.

In the foregoing it is assumed that the transducers 11 to 14 have a frequency response which is approximately uniform over a working range, but as an alternative to the use of such transducer in conjunction with a filter circuit it can also be arranged that the desired frequency selectivity can be obtained by using a frequency selective transducer.

The way in which the effect of the high frequencies is emphasized either by means of the filter circuit 16 or by the characteristics of the transducers, may vary in accordance with circumstances. FIGURE 2 shows the frequency characteristic of a system that has been used with success, wherein the abscissa indicates frequency and the ordinate indicates signal transmission amplitude. In this case the transducer employed consisted of a ceramic bimorph, of about 1 inch square on its major surfaces, and provided with suitable electrodes, the element being subjected directly to the acoustic pressure. Such an element has a frequency response which can be regarded as extending approximately between 50 c./s. and 10 kc./s. By use of an appropriate filter the characteristic of the system with frequency is made to rise approximately linearly the frequency being represented logarithmically, over the range in question, as a result of which the attenuation of frequencies below 500 c./s. is substantial.

A simple filter section of appropriate characteristic is shown in FIGURE 3, consisting of a series capacitance 20 and a shunt resistance 21, between input terminals 22 and output terminals 23. The relative values of the components 20 and 21 are chosen so as to give a time constant for the combination of approximately 50 microseconds. With the characteristic of FIGURE 2, this means that there will be an attenuation of approximately three decibels at a frequency of 20 kc./s. and that below this frequency the attenuation will increase at a rate approaching six decibels per octave. If desired, a filter section of the type shown in FIGURE 4 can be used, where the components 20 and 21, corresponding to those of FIGURE 3, are supplemented by a further capacitance 24 and a further resistance 25. The time constant of this combination is arranged to be the same, so that with this section the characteristic will resemble that of FIGURE 2 except that the attenuation below the frequency of 20 kc./s. will increase at a rate of approximately 12 decibels per octave.

Any type of suitable transmission can be used for the transmitter 17, to produce from aerial 18 a radiated wave which includes information concerning the amplitude of the response from transducers 11 to 14. At the ground station or stations, signals received on aerial 30 are applied to a receiver 31, of a type appropriate to the type of signal and modulation transmitted from the aerial 18. The receiver feeds a suitable indicator 32, which may consist of any suitable indicating means for displaying the miss distance and the receiver output can be applied also to any other equipment indicated generally at 33 for any purpose of indication, measurement or control.

In practice, the system is set up and is then calibrated by a series of tests, using projectiles of known calibers. Once calibrated, the system can then be used to give reliable indication of miss distance. If desired, the equipment indicated at 33 may include comparison means, by which the amplitude of the signal derived from the receiver is related to preset values, thus to indicate whether the projectile has been a "hit" or "miss."

One of the advantages of the present invention arises from the fact that it has been found that the nature of the distribution of energy in a pressure wave is very similar for projectiles of the same shape, for a given speed, regardless of the size of the projectile. Hence, for a particular projectile the extent of calibration necessary to establish the response due to particular miss distances is much reduced, and only a relatively small number of calibration shots, and theoretically one shot only, is necessary to fix the shape of the calibration curve for that projectile.

A device in accordance with the present invention has been found to work satisfactorily, and to give an adequately accurate indication of miss distance. The simplicity of the apparatus involved is advantageous, since certain parts of the equipment must obviously be regarded as expandable.

While the foregoing description sets forth the principles of the invention in connection with specific apparatus, it is to be understood that the description is made only by way of example and not as a limitation of the scope of the invention as set forth in the objects thereof and in the accompanying claims.

I claim:
1. A miss distance measuring system for indicating the distance by which a projectile misses a target comprising
    pressure sensitive transducer means on said target responsive to a pressure wave produced by the passage of said projectile in the region of said target, the output of said transducer means comprising signals having frequency components extending from those in the low audio frequency range to those in the higher audio frequency range, said signals being generated in response to said pressure wave, frequency selective filter means coupled to receive the output from said transducer, said filter means having a frequency characteristic such that the frequencies at the lower frequency end of the audio range are substantially attenuated while said higher frequencies pass through substantially unattenuated to thereby provide the parameter by which said indication of distance is achieved, a transmitter coupled to receive the high frequency output from said filter, amplifier means coupled between said transducer means and said transmitter for increasing the amplitude of the high frequency signals, an antenna coupled to said transmitter for radiating the signals from said transmitter, a receiver for receiving the transmitted signals, and means connected to said receiver for indicating said miss distance.

2. The system described in claim 1 wherein the response of said transducer means is frequency selective to provide a substantially greater output at said higher frequencies than at said lower frequencies.

3. The system described in claim 1 wherein said frequency selective filter means has a characteristic such that signals of frequencies below 500 cycles per second are attenuated more than signals of frequencies above this frequency.

4. The system described in claim 1 wherein said frequency selective filter means comprises a high-pass resistance-capacitance circuit.

5. The system described in claim 4 wherein said filter means has a time constant of approximately 50 microseconds.

6. The system described in claim 1 wherein said transducer means includes a plurality of transducers arranged to respond differently to said pressure wave, and wherein said filter means and said amplifier means each include a plurality of channel sections corresponding to the number of transducers employed, each channel being arranged to receive the output from a different transducer.

References Cited by the Examiner

UNITED STATES PATENTS

| | | | |
|---|---|---|---|
| 2,448,587 | 9/48 | Green | 340—16 |
| 2,925,582 | 2/60 | Mattei et al. | 340—16 |
| 2,966,657 | 12/60 | Price | 340—16 |

FOREIGN PATENTS 672,782  5/58  Great Britain.

OTHER REFERENCES

"A Determination of the Wave Forms and Laws of Propagation and Dissipation of Ballistic Shock Waves," by J. W. Dumond et al., Journal of the Acoustical Society of America, vol. 18, No. 1, July 1946, pages 97–118 relied on.

LEWIS H. MYERS, *Primary Examiner.*

CHESTER L. JUSTUS, *Examiner.*